US012682106B2

(12) United States Patent
Ye

(10) Patent No.: US 12,682,106 B2
(45) Date of Patent: Jul. 14, 2026

(54) CLOUD SERVICE SYSTEM AND DATA PROCESSING METHOD BASED ON CLOUD SERVICE

(71) Applicant: Huawei Cloud Computing Technologies Co., Ltd., Guizhou (CN)

(72) Inventor: Chuan Ye, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 131 days.

(21) Appl. No.: 18/477,053

(22) Filed: Sep. 28, 2023

(65) Prior Publication Data

US 2024/0020412 A1     Jan. 18, 2024

Related U.S. Application Data

(63) Continuation of application No. PCT/CN2022/083961, filed on Mar. 30, 2022.

(30) Foreign Application Priority Data

Mar. 31, 2021    (CN) .......................... 202110352472.3

(51) Int. Cl.
*H04L 9/32*          (2006.01)
*G06F 9/455*        (2018.01)
             (Continued)

(52) U.S. Cl.
CPC ...... *G06F 21/6245* (2013.01); *G06F 9/45558* (2013.01); *G06F 2009/45595* (2013.01)

(58) Field of Classification Search
CPC ............. G06F 21/6245; G06F 9/45558; G06F 2009/45595; G06F 21/53; G06F 21/72; G06F 2009/45587; G06F 2221/034; G06F 2221/2103; G06F 2221/2149; G06F 21/57; G06F 21/602; G06F 21/46; G06F 21/56; H04L 67/10

(Continued)

(56) References Cited

U.S. PATENT DOCUMENTS 10,821,227 B2 * 11/2020 Yang ........................ G01G 17/04
2011/0296234 A1 * 12/2011 Oshins ................ G06F 9/45558
                                                                        718/1

(Continued)

FOREIGN PATENT DOCUMENTS

CN          107197043 A   *   9/2017  ............. H04L 43/16
CN          107682159 A       2/2018
WO    WO-2020220974 A1 * 11/2020  ............... H04L 9/08

OTHER PUBLICATIONS

Zhilou Yu et al:"A Trust Verification Architecture with Hardware Root for Secure Clouds," Nov. 9, 2018, total 12 pages.

*Primary Examiner* — Berhanu Shitayewoldetadik
(74) *Attorney, Agent, or Firm* — Conley Rose, P.C.

(57)          ABSTRACT

A cloud service system includes a first server and a physical device. The first server and the physical device are coupled through a physical channel. The first server includes a cloud instance. The physical device includes a trusted execution environment corresponding to the cloud instance. The physical device is configured to perform confidential calculation on data from the cloud instance through the trusted execution environment, and send a calculation result to the cloud instance.

20 Claims, 6 Drawing Sheets

(51) Int. Cl.

| | |
|---|---|
| *G06F 15/16* | (2006.01) |
| *G06F 21/60* | (2013.01) |
| *G06F 21/62* | (2013.01) |
| *G06F 21/74* | (2013.01) |
| *H04L 9/06* | (2006.01) |
| *H04L 9/08* | (2006.01) |
| *H04L 15/16* | (2006.01) |
| *H04L 29/00* | (2006.01) |
| *H04L 29/06* | (2006.01) |
| *H04L 29/08* | (2006.01) |

(58) Field of Classification Search
USPC .......................................................... 726/26
See application file for complete search history.

(56) References Cited

U.S. PATENT DOCUMENTS

| | | | |
|---|---|---|---|
| 2014/0208123 A1 | 7/2014 | Roth et al. | |
| 2016/0070929 A1* | 3/2016 | Potlapally | G06F 21/55 |
| | | | 726/26 |
| 2017/0061436 A1* | 3/2017 | Liu | H04M 1/72403 |
| 2017/0322899 A1* | 11/2017 | Ni | G06F 13/4022 |
| 2018/0211035 A1* | 7/2018 | Costa | H04L 9/0643 |
| 2019/0365994 A1* | 12/2019 | Yang | G01G 19/14 |
| 2020/0134200 A1 | 4/2020 | Williams et al. | |
| 2021/0306304 A1* | 9/2021 | Hwang | G06F 21/121 |
| 2022/0385455 A1* | 12/2022 | Imabayashi | G06F 21/602 |
| 2023/0007483 A1* | 1/2023 | Mueck | H04W 12/069 |

* cited by examiner

CLOUD SERVICE SYSTEM AND DATA PROCESSING METHOD BASED ON CLOUD SERVICE

CROSS-REFERENCE TO RELATED APPLICATIONS

This is a continuation of International Patent Application No. PCT/CN2022/083961 filed on Mar. 30, 2022, which claims priority to Chinese Patent Application No. 202110352472.3 filed on Mar. 31, 2021. The disclosures of the aforementioned applications are hereby incorporated by reference in their entireties.

TECHNICAL FIELD

This disclosure relates to the field of computer technologies, and in particular, to a cloud service system and a data processing method based on a cloud service.

BACKGROUND

With increasing maturity and rapid development of a cloud service system, a data security issue gradually becomes a focus.

In the cloud service system, to ensure data security, in addition to allocating a common virtual machine to a user having a confidential calculation requirement, a server may further create a trusted execution environment for the user. The trusted execution environment may perform confidential calculation on data from the common virtual machine, and return a calculation result to the common virtual machine for use by the user, to ensure security of sensitive data. For example, when the user needs to make an electronic payment, the user may send an entered password to the trusted execution environment through the common virtual machine. The trusted execution environment stores a correct password preset by the user is stored, and therefore may perform verification on the password input by the user based on the correct password, and return a verification result to the common virtual machine for use by the user, to avoid leakage of the correct password.

In the server, both the common virtual machine and the trusted execution environment are managed and controlled by a virtual machine monitor (VMM). Once escape vulnerability occurs in the VMM, the VMM may be maliciously attacked by a hacker (that is, an operating system of the server is compromised), and therefore the hacker can obtain the sensitive data of the user from the trusted execution environment through the VMM. It can be learned that a virtualization escape causes a security problem to the trusted execution environment.

SUMMARY

Embodiments of this disclosure provide a cloud service system and a data processing method based on a cloud service, to avoid a potential risk posed by a virtualization escape to a trusted execution environment.

A first aspect of embodiments of this disclosure provides a cloud service system. The system includes a first server and a physical device, and the first server and the physical device are connected through a physical channel. The first server includes a cloud instance that serves a specific user. The physical device includes the trusted execution environment corresponding to the cloud instance, that is, the cloud instance and the trusted execution environment are bound to jointly serve the user, to meet a confidential calculation requirement of the user. For example, the first server may create a common virtual machine that serves the specific user, and the physical device connected to the first server may create the trusted execution environment corresponding to the common virtual machine. In this way, the trusted execution environment and the common virtual machine are bound to jointly serve the user.

When the user has the confidential calculation requirement, the user may input to-be-calculated data into the cloud instance of the first server, so that the cloud instance sends the data to the trusted execution environment of the physical device. The trusted execution environment of the physical device performs confidential calculation on the data from the cloud instance, and sends a calculation result to the cloud instance for use by the user, to ensure security of sensitive data of the user. The foregoing example is still used. When the user needs to make an electronic payment, the user may enter a to-be-verified password into the common virtual machine of the first server, and the common virtual machine sends, to the trusted execution environment of the physical device, the password input by the user. A trusted virtual machine stores a correct password preset by the user, and may verify, based on the correct password, the password input by the user, and return a verification result to the common virtual machine for use by the user.

In embodiments of this disclosure, the cloud service system includes the first server and the physical device. The cloud instance is deployed on the first server, and the trusted execution environment corresponding to the cloud instance is deployed on the physical device. The physical device is configured to perform confidential calculation on the data from the cloud instance through the trusted execution environment, and send the calculation result to the cloud instance. Because the first server and the physical device are connected through the physical channel, which is equivalent to describing that the cloud instance of the first server and the trusted execution environment of the physical device are physically isolated, even if an operating system of the first server is maliciously compromised, the sensitive data of the user cannot be obtained from the trusted execution environment of the physical device, to avoid a potential risk posed by a virtualization escape to the trusted execution environment.

In a possible implementation, the first server further includes a first operating system, the physical device further includes a second operating system, and the first operating system of the first server and the second operating system of the physical device may communicate with each other through the physical channel. Further, when having the confidential calculation requirement, the user may input the to-be-calculated data into the cloud instance of the first server, and then the cloud instance sends the data to the first operating system of the first server. Then, the first operating system sends the data to the second operating system of the physical device, so that the second operating system sends the data to the trusted execution environment of the physical device. After receiving the data, the trusted execution environment of the physical device may perform confidential calculation on the data, and send the calculation result to the second operating system. Finally, the second operating system sends the calculation result to the first operating system, so that the first operating system sends the calculation result to the cloud instance for use by the user. In the foregoing implementation, the first operating system and the second operating system communicate with each other through the physical channel. Therefore, a communication behavior that can be implemented between the cloud instance and the trusted execution environment may be limited. For example, the first operating system and the second operating system agree in advance that only an operation related to a confidential calculation request can be implemented. In this way, even if the first operating system is maliciously compromised by a hacker, and the hacker controls the first operating system to send a sensitive data obtaining request to the second operating system, after receiving the request, the trusted execution environment rejects an operation related to the request. In this way, even if the hacker compromises the first operating system, the hacker cannot obtain the sensitive data of the user from the trusted execution environment, to avoid the potential risk posed by the virtualization escape to the trusted execution environment.

In a possible implementation, the second operating system of the physical device may first obtain a key corresponding to the cloud instance, that is, a key of the user. Then, the second operating system sends the key to the trusted execution environment of the physical device, so that the trusted execution environment can perform confidential calculation on the data from the cloud instance based on the key. For example, the trusted execution environment may perform an authentication operation, a data encryption operation, a sensitive operation, and the like in the confidential calculation on the data based on the key, to obtain the calculation result.

In a possible implementation, the cloud instance is a virtual machine, a container, or a bare metal server, and the trusted execution environment is a virtual machine, a container, or a bare metal server. In a related technology, the virtual machine and the trusted execution environment that matches the virtual machine are deployed on a same server. In other words, in the related technology, a feasible execution environment can be implemented only in a virtual machine scenario. However, in the foregoing implementation of this disclosure, both the cloud instance and the trusted execution environment may be bare metal servers. Therefore, the cloud service system provided in this disclosure can also implement the feasible execution environment in a bare metal scenario.

In a possible implementation, the physical device is a second server, a smart card, or an offload card. In the foregoing implementation, the physical device may be the second server of a same type as the first server, or may be a smart card or an offload card inserted into the first server.

In a possible implementation, if the physical device is the second server, the physical channel is a high-speed communication backplane, a high-speed computer extended bus, or a physical network.

In a possible implementation, if the physical device is the smart card or the offload card, the physical channel is a high-speed computer extended bus.

A second aspect of embodiments of this disclosure provides a data processing method based on a cloud service system. The system includes a first server and a physical device. The first server and the physical device are connected through a physical channel, the first server includes a cloud instance, and the physical device includes a trusted execution environment corresponding to the cloud instance. The method includes the following. The physical device performs confidential calculation on data from the cloud instance through the trusted execution environment, and sends a calculation result to the cloud instance.

In embodiments of this disclosure, the cloud service system includes the first server and the physical device. The cloud instance is deployed on the first server, and the trusted execution environment corresponding to the cloud instance is deployed on the physical device. The physical device is configured to perform confidential calculation on the data from the cloud instance through the trusted execution environment, and send the calculation result to the cloud instance. Because the first server and the physical device are connected through the physical channel, which is equivalent to describing that the cloud instance of the first server and the trusted execution environment of the physical device are physically isolated, even if an operating system of the first server is maliciously compromised, sensitive data of a user cannot be obtained from the trusted execution environment of the physical device, to avoid a potential risk posed by a virtualization escape to the trusted execution environment.

In a possible implementation, the first server further includes a first operating system, and the physical device further includes a second operating system. That the physical device performs confidential calculation on data from the cloud instance through the trusted execution environment, and sends a calculation result to the cloud instance includes the following. The physical device receives the data of the cloud instance that is sent by the first operating system through the second operating system, the physical device performs confidential calculation on the data through the trusted execution environment, to obtain the calculation result, and the physical device sends the calculation result to the first operating system through the second operating system, so that the first operating system sends the calculation result to the cloud instance.

In a possible implementation, the method further includes the following. The physical device obtains a key corresponding to the cloud instance through the second operating system. That the physical device performs confidential calculation on the data through the trusted execution environment, to obtain the calculation result includes the following. The physical device performs confidential calculation on the data through the trusted execution environment based on the key, to obtain the calculation result.

In a possible implementation, the physical device is a second server, a smart card, or an offload card.

In a possible implementation, if the physical device is the second server, the physical channel is a high-speed communication backplane, a high-speed computer extended bus, or a physical network.

In a possible implementation, if the physical device is the smart card or the offload card, the physical channel is a high-speed computer extended bus.

In a possible implementation, the cloud instance is a virtual machine, a container, or a bare metal server, and the trusted execution environment is a virtual machine, a container, or a bare metal server.

A third aspect of embodiments of this disclosure provides a physical device. The physical device is disposed in a cloud service system, the system further includes a first server, the first server and the physical device are connected through a physical channel, the first server includes a cloud instance, the physical device includes a trusted execution environment corresponding to the cloud instance, and the physical device includes a memory and a processor.

The memory stores code, the processor is configured to execute the code, and when the code is executed, the physical device performs the method according to any one of the second aspect or the possible implementations of the second aspect.

A fourth aspect of embodiments of this disclosure provides a computer storage medium. The computer storage medium stores a computer program, and when the program is executed by a computer, the computer is enabled to implement the method according to any one of the second aspect or the possible implementations of the second aspect.

A fifth aspect of embodiments of this disclosure provides a computer program product. The computer program product stores instructions, and when the instructions are executed by a computer, the computer is enabled to implement the method according to any one of the second aspect or the possible implementations of the second aspect.

In embodiments of this disclosure, the cloud service system includes the first server and the physical device. The cloud instance is deployed on the first server, and the trusted execution environment corresponding to the cloud instance is deployed on the physical device. The physical device is configured to perform confidential calculation on the data from the cloud instance through the trusted execution environment, and send the calculation result to the cloud instance. Because the first server and the physical device are connected through a physical channel, which is equivalent to describing that the cloud instance of the first server and the trusted execution environment of the physical device are physically isolated, even if the operating system of the first server is maliciously compromised, the sensitive data of the user cannot be obtained from the trusted execution environment of the physical device, to avoid the potential risk posed by the virtualization escape to the trusted execution environment.

DESCRIPTION OF EMBODIMENTS

Embodiments of this disclosure provide a cloud service system and a data processing method based on a cloud service, to avoid a potential risk posed by a virtualization escape to a trusted execution environment.

In the specification, the claims, and the accompanying drawings of this disclosure, the terms "first", "second", and the like are intended to distinguish between similar objects but do not necessarily indicate a specific order or sequence. It should be understood that the terms used in such a way are interchangeable in appropriate circumstances, and this is merely a discrimination manner that is used when objects having a same attribute are described in embodiments of this disclosure. In addition, the terms "include", "have" and any other variants mean to cover a non-exclusive inclusion, so that a process, method, system, product, or device that includes a series of units is not necessarily limited to those units, but may include another unit not clearly listed or inherent to such a process, method, product, or device.

With increasing maturity and rapid development of a cloud service system, a data security issue gradually becomes a focus.

Figure 1:
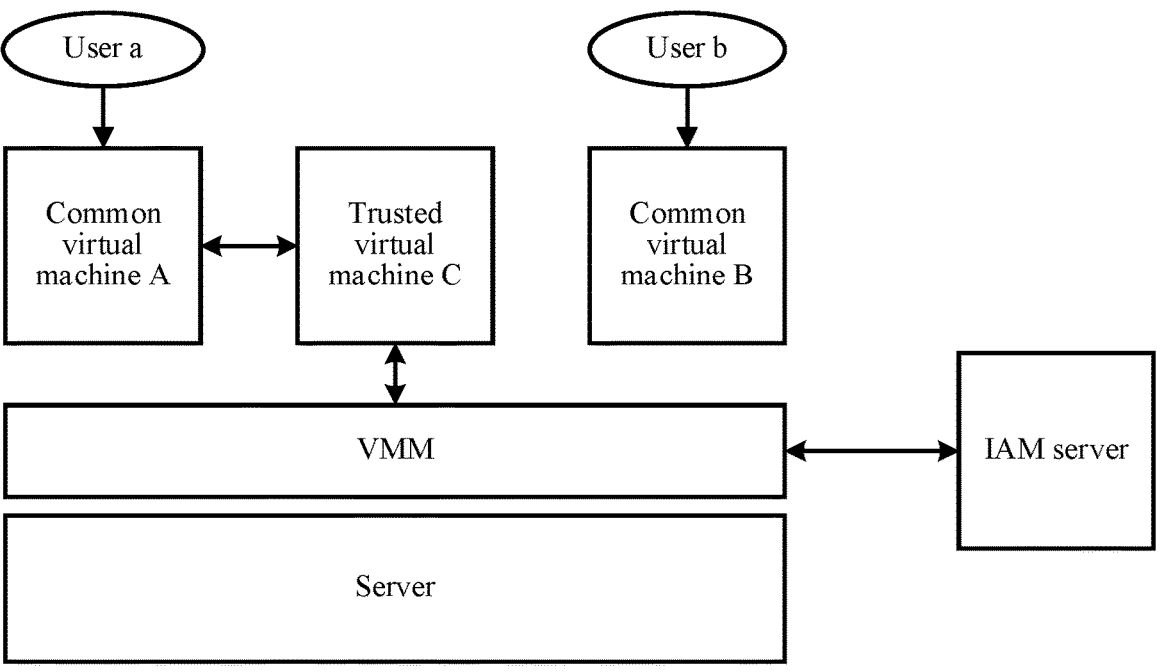
FIG. 1 is a schematic diagram of a cloud service system in a related technology.

FIG. 1 is a schematic diagram of a cloud service system in a related technology. As shown in FIG. 1, in the cloud service system, a common virtual machine A that serves a user a, a common virtual machine B that serves a user b, a trusted virtual machine C that matches the common virtual machine A, and a VMM that manages and controls each virtual machine are deployed on a server. The trusted virtual machine C may be considered as a trusted execution environment of the common virtual machine A. The trusted virtual machine C is different from the common virtual machine A and the common virtual machine B. The trusted virtual machine C does not have any external network access channel, and can completely prevent intrusion of another user, to ensure security of sensitive data of a user. The trusted virtual machine C has two secure channels. One secure channel is used to transmit data input by the user with the common virtual machine A, and the other secure channel is used to obtain a key of the user a from an identity and access management (TAM) server through the VMM, to perform, based on the key, confidential calculation on the data input by the user.

In the server, both the common virtual machine A and the trusted virtual machine C are managed and controlled by the VMM. Once escape vulnerability occurs in the VMM, the VMM may be maliciously attacked by a hacker (to be specific, an operating system of the server is compromised). Therefore, the hacker may obtain sensitive data of the user a from the trusted virtual machine C through the VMM. It can be learned that a virtualization escape causes a security problem to the trusted execution environment.

Figure 2:
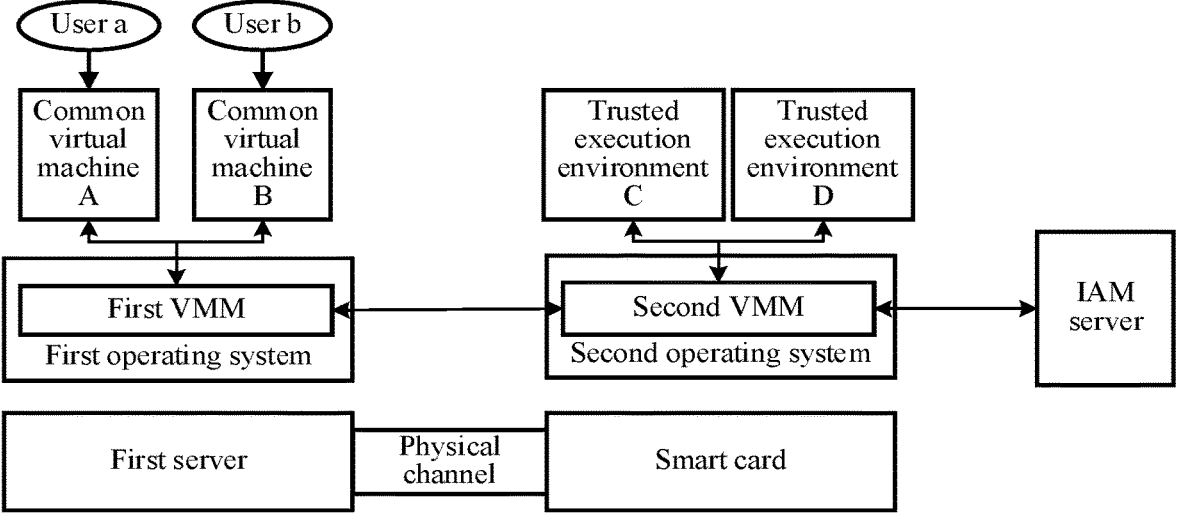
FIG. 2 is a schematic diagram of a cloud service system according to an embodiment of this disclosure.

To resolve the foregoing problem, embodiments of this disclosure provide a new cloud service system. The cloud service system includes a first server and a physical device, and the first server and the physical device may be presented in a plurality of forms. A first form means that both the first server and the physical device serve one or more users based on a virtualization technology. A second form means that the first server side is a bare metal, and serves a specific user. A third form means that a plurality of first servers form a heterogeneous server to serve a plurality of users. The following describes, with reference to FIG. 2, the first form of the cloud service system provided in embodiments of this disclosure. FIG. 2 is a schematic diagram of the cloud service system according to an embodiment of this disclosure. As shown in FIG. 2, the cloud service system includes the first server and a smart card. The first server and the smart card are connected through a physical channel, and the physical channel may be a high-speed computer extended bus. For example, the smart card may be inserted into a Peripheral Component Interconnect Express (PCIE) interface of the first server, to implement a physical connection between the first server and the smart card.

Based on the virtualization technology, a common virtual machine that serves a user and a first VMM that manages and controls the common virtual machine are deployed on the first server, and the first VMM is disposed in a first operating system of the first server. A trusted execution environment (TEE) corresponding to the common virtual machine and a second VMM that manages and controls the trusted execution environment (or a trusted virtual machine) are deployed on the smart card, and the second VMM is disposed in a second operating system of the smart card. It may be understood that the first operating system may be a general-purpose operating system, and the second operating system may be an embedded operating system (EOS) or a general-purpose operating system. In an example shown in FIG. 2, a common virtual machine A that serves a user a, a common virtual machine B that serves a user b, and the first VMM that manages and controls the common virtual machine A and the common virtual machine B are deployed on the first server. A trusted execution environment C corresponding to the common virtual machine A, a trusted execution environment D corresponding to the common virtual machine B, and the second VMM that manages and controls the trusted execution environment C and the trusted execution environment D are deployed on the smart card.

Because the first server and the smart card are connected through the physical channel, which is equivalent to describing that the common virtual machine of the first server and the trusted execution environment of the smart card communicate with each other through the physical channel, a communication behavior that can be implemented between the common virtual machine and the trusted execution environment may be agreed on in advance. For example, the common virtual machine and the trusted execution environment agree in advance that only an operation related to a confidential calculation request can be implemented. In this way, even if the trusted execution environment receives other requests than the confidential calculation request, the trusted execution environment rejects execution of these requests, to ensure security of sensitive data of the user.

Further, before confidential calculation is performed, the second VMM may first obtain a key corresponding to the common virtual machine, that is, a key of the user, and send the key to the trusted execution environment, so that the trusted execution environment can implement the confidential calculation based on the key. The second VMM may obtain the key corresponding to the common virtual machine in a plurality of manners. For example, an IAM server is preset in the smart card, that is, the key of the user is preset. Therefore, the second VMM may directly obtain the key of the user. For another example, the second VMM may obtain the key of the user (as shown in FIG. 2) from a remote IAM server. This is not limited herein. The foregoing example is still used. The second VMM may first obtain a key of the user a (namely, a key corresponding to the common virtual machine A) and a key of the user b (namely, a key corresponding to the common virtual machine B) from the IAM server. Then, the second VMM sends the key of the user a to the trusted execution environment C, and sends the key of the user b to the trusted execution environment D.

When having a confidential calculation requirement, the user may input to-be-calculated data to the common virtual machine that serves the user. The common virtual machine sends, to the first VMM, the data input by the user. Then, the first VMM sends the data to the second VMM, so that the second VMM sends the data to the trusted execution environment. After receiving the data, the trusted execution environment may perform confidential calculation on the data based on the key of the user, and send a calculation result to the second VMM. Finally, the second VMM sends the calculation result to the first VMM, so that the first VMM sends the calculation result to the common virtual machine for use by the user. The confidential calculation includes an authentication operation, a data encryption operation, a data verification operation, and the like. The following briefly describes the foregoing operations with reference to two examples.

(1) When needing to make an electronic payment, the user a may enter a to-be-verified password into the common virtual machine A. The common virtual machine A generates a confidential calculation request, and sends the request to the first VMM, where the request includes identity verification information and the to-be-verified password. Then, the first VMM sends the request to the second VMM, so that the second VMM sends the request to the trusted execution environment C. Then, the trusted execution environment C may parse the request to obtain the to-be-verified password and the identity verification information. The trusted execution environment C first performs verification on the identity verification information based on the key of the user a. If the identity verification succeeds, it indicates that the request is from the user a, and a subsequent operation may be performed. If the identity verification fails, it indicates that the request is not from the user a, and a subsequent operation is rejected. After the identity verification succeeds, because the trusted execution environment C stores a correct password input by the user in advance, the correct password may be compared with the password input by the user, to obtain a verification result (to be specific, the password verification succeeds or the password verification fails). Finally, the trusted execution environment C sends the verification result to the second VMM, and the second VMM sends the verification result to the first VMM, so that the first VMM sends the verification result to the common virtual machine A for use by the user a.

(2) When needing to set a password for an electronic payment, the user a may enter a to-be-set password into the common virtual machine A. The common virtual machine A generates a confidential calculation request, and sends the request to the first VMM, where the request includes identity verification information and the to-be-set password. Then, the first VMM sends the request to the second VMM, so that the second VMM sends the request to the trusted execution environment C. Then, the trusted execution environment C may parse the request to obtain the to-be-set password and the identity verification information. The trusted execution environment C first performs verification on the identity verification information based on the key of the user a. If the identity verification succeeds, it indicates that the request is from the user a, and a subsequent operation may be performed. If the identity verification fails, it indicates that the request is not from the user a, and a subsequent operation is rejected. After the identity verification succeeds, the trusted execution environment C encrypts the to-be-set password based on the key of the user a, to obtain an encrypted password. Finally, the trusted execution environment C sends the encrypted password to the second VMM, and the second VMM sends the encrypted password to the first VMM, so that the first VMM sends the encrypted password to the common virtual machine A for storage. In this way, the common virtual machine A stores the encrypted password instead of the original password input by the user, to ensure security of sensitive data of the user. In addition, when needing to make the electronic payment, the user may enter the to-be-verified password into the common virtual machine A. In this way, the trusted execution environment C encrypts the to-be-verified password again (for a specific process, refer to the foregoing descriptions, and details are not described herein again), and an encrypted password is returned to the common virtual machine A. The common virtual machine A compares the originally stored password with the encrypted password, to obtain a verification result.

It should be understood that, in this embodiment, one or more cloud instances (that is, common virtual machines)

may be deployed on the first server, to server one or more users. Correspondingly, one or more trusted execution environments may also be deployed on the smart card.

Figure 3:
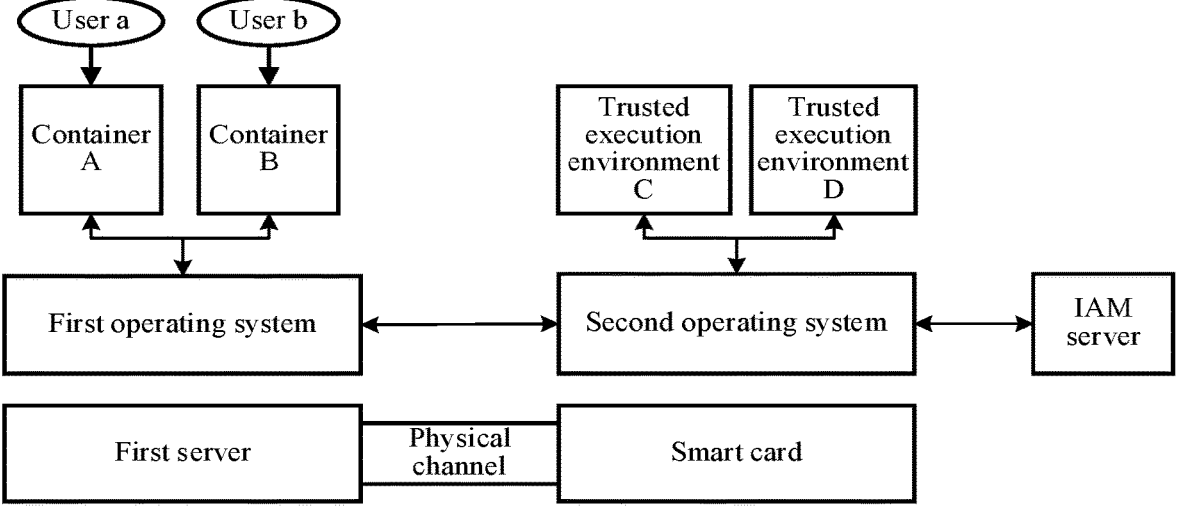
FIG. 3 is another schematic diagram of a cloud service system according to an embodiment of this disclosure.

It should be further understood that, in this embodiment, an example in which the cloud instance of the first server is a virtual machine is used for description, and the cloud instance of the first server may alternatively be a container or the like. Similarly, the same is true for the trusted execution environment of the smart card. In an example shown in FIG. 3 (FIG. 3 is another schematic diagram of the cloud service system according to an embodiment of this disclosure), both a cloud instance of the first server and a trusted execution environment of a smart card are presented in a form of a container. A difference from the example shown in FIG. 2 lies in that a VMM does not need to be disposed in an operating system of the first server and the smart card.

It should be further understood that, in this embodiment, an example in which a physical device is the smart card is used for description. Alternatively, the physical device may be a second server, an offload card, or the like. The offload card may be presented in a form of a field-programmable gate array (FPGA), an application-specific integrated circuit (ASIC), or the like.

Figure 4:
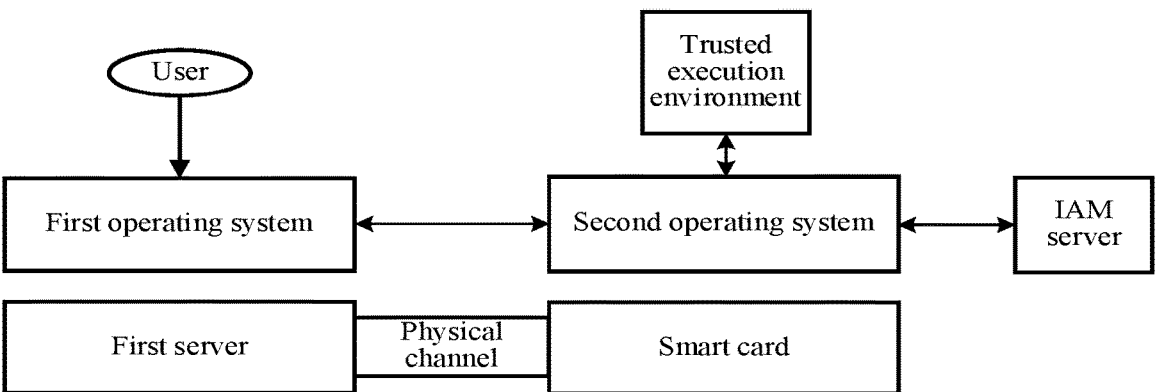
FIG. 4 is another schematic diagram of a cloud service system according to an embodiment of this disclosure.

The foregoing describes in detail the first form of the cloud service system provided in embodiments of this disclosure. The following describes the second form of the cloud service system provided in embodiments of this disclosure. FIG. 4 is another schematic diagram of the cloud service system according to an embodiment of this disclosure. As shown in FIG. 4. In the cloud service system, the first server and a smart card are connected through a physical channel. For descriptions of the physical channel, refer to related descriptions in the embodiment shown in FIG. 2. Details are not described herein again.

The first server is used as an independent physical server, and serves a specific user in a form of a bare metal (that is, a bare metal server). For the smart card, a trusted execution environment (a trusted container) corresponding to the first server and a second operating system that manages and controls the trusted execution environment may be deployed based on the virtualization technology.

In this case, a cloud instance of the first server is a bare metal server, and an operation performed by the cloud instance of the first server may be understood as an operation performed by a first operating system of the first server, that is, operations such as receiving data input by the user, forwarding the data input by the user, and forwarding a calculation result are all completed by the first operating system of the first server. However, the second operating system of the smart card still completes operations such as obtaining a key of the user, forwarding the data input by the user, and forwarding the calculation result, and the trusted execution environment of the smart card still completes operations such as performing confidential calculation on the data input by the user. For descriptions of the operations, refer to related descriptions in the embodiment shown in FIG. 2. Details are not described herein again.

Figure 5:
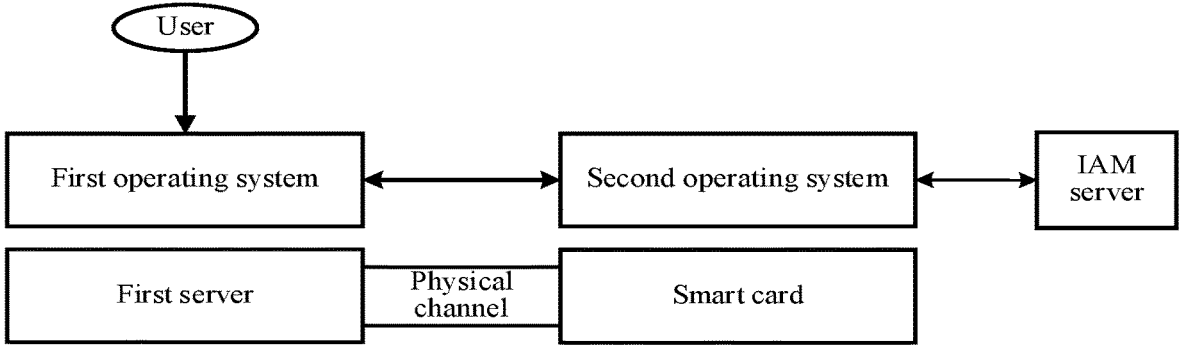
FIG. 5 is another schematic diagram of a cloud service system according to an embodiment of this disclosure.
Figure 6:
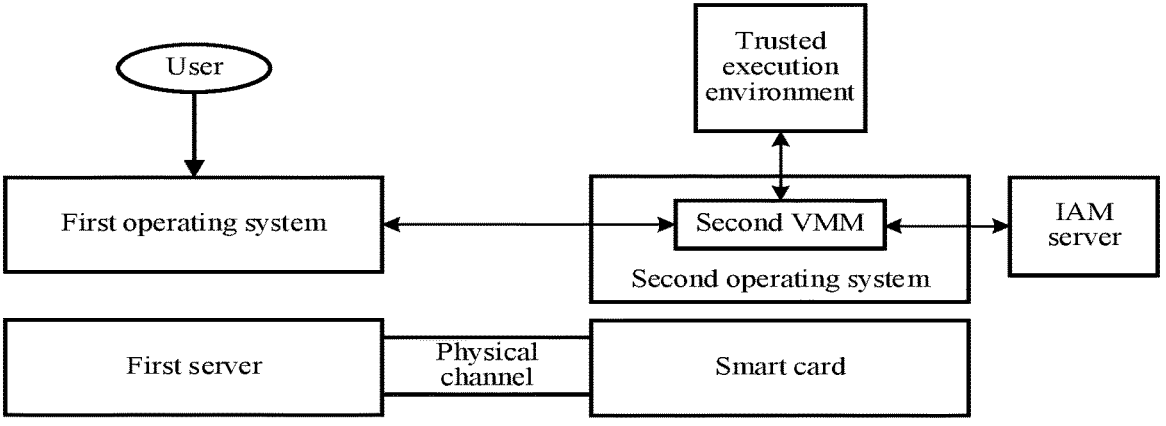
FIG. 6 is another schematic diagram of a cloud service system according to an embodiment of this disclosure.

It should be understood that, in this embodiment, an example in which the cloud instance of the first server is the bare metal server and the trusted execution environment of the smart card is the container is used for description. Alternatively, the trusted execution environment of the smart card may be a bare metal server (FIG. 5 is another schematic diagram of the cloud service system according to an embodiment of this disclosure), or the trusted execution environment of the smart card may be a virtual machine (FIG. 6 is another schematic diagram of the cloud service system according to an embodiment of this disclosure), or the like.

It should be further understood that, in this embodiment, an example in which a physical device is the smart card is used for description. Alternatively, the physical device may be a second server, an offload card, or the like.

Figure 7:
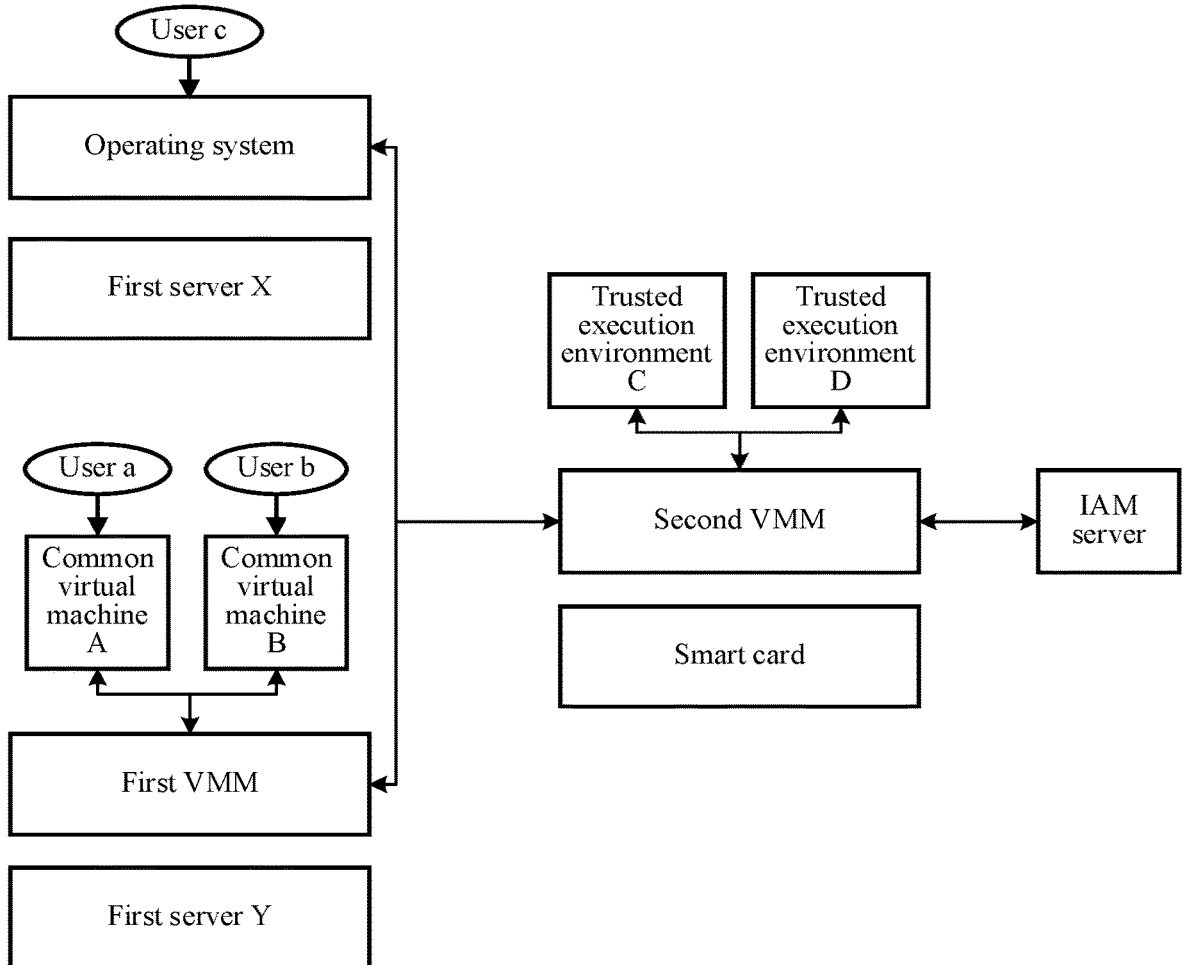
FIG. 7 is another schematic diagram of a cloud service system according to an embodiment of this disclosure.

The foregoing describes in detail the second form of the cloud service system provided in embodiments of this disclosure. The following describes the third form of the cloud service system provided in embodiments of this disclosure. FIG. 7 is another schematic diagram of the cloud service system according to an embodiment of this disclosure. As shown in FIG. 7, the cloud service system includes a second server and a plurality of first servers. The plurality of first servers form a heterogeneous server, that is, different first servers are from different vendors. The second server and the plurality of first servers may be connected through a physical channel, and the physical channel may be a high-speed communication backplane, a high-speed computer extended bus, a physical network, or the like. The high-speed computer extended bus may be a PCIE switch, and the physical network may be a network device or the like that performs communication based on an Internet Protocol (IP), a Remote Direct Memory Access (RDMA) over Converged Ethernet (RoCE) protocol, or an RDMA protocol.

In an example shown in FIG. 7, the cloud service system includes a first server X and a first server Y. The first server X serves a user c in a form of a bare metal. A common virtual machine A that serves a user a, a common virtual machine B that serves a user b, and a first VMM that manages and controls the common virtual machine A and the common virtual machine B are deployed on the first server Y. Correspondingly, a trusted execution environment C corresponding to the first server X, a trusted execution environment D corresponding to the common virtual machine A, and a second VMM that manages and controls the trusted execution environment C and the trusted execution environment D are deployed on the second server.

The trusted execution environment C may complete a confidential calculation requirement of the user c with the first server X, and the trusted execution environment D may complete a confidential calculation requirement of the user a with the common virtual machine A. For descriptions of a confidential calculation process, refer to related descriptions in the embodiment shown in FIG. 2. Details are not described herein again.

It should be understood that, in this embodiment, an example in which cloud instances of the first server are a combination of a virtual machine and a bare metal server is used for description. Alternatively, the cloud instances of the first server may be a combination of a container and a bare metal server, or the cloud instances of the first server may all be virtual machines, or the cloud instances of the first server may all be containers, or the cloud instances of the first server may all be bare metal servers, or the like.

It should be further understood that, in this embodiment, an example in which a cloud instance of the second server is a virtual machine is used for description. Alternatively, the cloud instance of the second server may be a container or the like.

It should be further understood that, in this embodiment, an example in which a physical device is the second server is used for description. Alternatively, the physical device may be a smart card, an offload card, or the like.

In embodiments of this disclosure, the cloud service system includes the first server and the physical device. The cloud instance is deployed on the first server, and the trusted execution environment corresponding to the cloud instance is deployed on the physical device. The physical device is configured to perform confidential calculation on data from the cloud instance through the trusted execution environment, and send a calculation result to the cloud instance. Because the first server and the physical device are connected through the physical channel, which is equivalent to describing that the cloud instance of the first server and the trusted execution environment of the physical device are physically isolated, even if an operating system of the first server is maliciously compromised, sensitive data of a user cannot be obtained from the trusted execution environment of the physical device, to avoid a potential risk posed by a virtualization escape to the trusted execution environment.

Further, in a related technology, the virtual machine and the trusted execution environment that matches the virtual machine are deployed on a same server, that is, in the related technology, a feasible execution environment can be implemented only in a virtual machine scenario. However, in the foregoing implementation of this disclosure, both the cloud instance of the first server and the trusted execution environment of the physical device may be bare metal servers (namely, the examples shown in FIG. 4 to FIG. 6). Therefore, the cloud service system provided in this disclosure can also implement the feasible execution environment in a bare metal scenario.

Further, in a heterogeneous server scenario, a plurality of trusted execution environments disposed for different first servers may be uniformly deployed on a same physical device (namely, the example shown in FIG. 7), that is, a capability of providing a unified trusted execution environment for a cluster formed by heterogeneous servers is provided, so that resource utilization can be improved.

Further, the physical channel may be made into dedicated hardware of a vendor according to an actual requirement, or used to further improve security of the entire cloud service system through a dedicated network.

Further, a cloud pooled trusted execution environment may be subsequently sold in a form of a cloud service, or may be flexibly deployed on a hybrid cloud node side or an edge cloud node side, to further improve local security on a user side.

Figure 8:
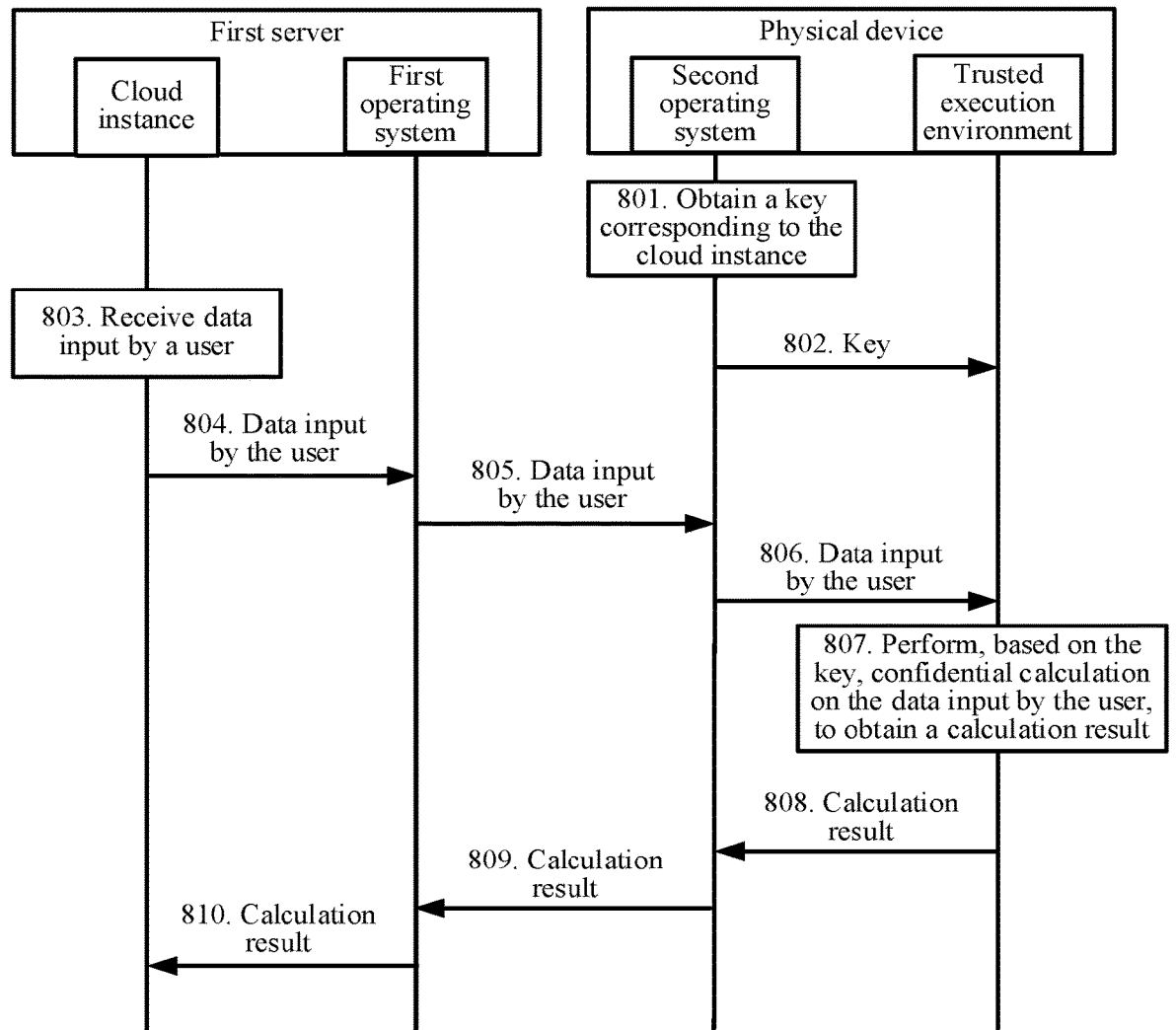
FIG. 8 is a flowchart of a data processing method based on a cloud service system according to an embodiment of this disclosure.

The foregoing describes in detail the cloud service system provided in embodiments of this disclosure, and the following describes a data processing method based on a cloud service system. FIG. 8 is a flowchart of the data processing method based on a cloud service system according to an embodiment of this disclosure. The method may be applied to a cloud service system. The system (for the system, refer to the cloud service system shown in FIG. 2 to FIG. 7) includes a first server and a physical device. The first server and the physical device are connected through a physical channel. The first server includes a cloud instance and a first operating system. The physical device includes a trusted execution environment corresponding to the cloud instance and a second operating system. The method includes the following steps.

801. The second operating system of the physical device obtains a key corresponding to the cloud instance.

802. The second operating system of the physical device sends the key to the trusted execution environment of the physical device.

803. The cloud instance of the first server receives data input by a user.

804. The cloud instance of the first server sends, to the first operating system of the first server, the data input by the user.

805. The second operating system of the physical device receives the data that is input by the user and that is sent by the first operating system.

806. The second operating system of the physical device sends, to the trusted execution environment of the physical device, the data input by the user.

807. The trusted execution environment of the physical device performs, based on the key, confidential calculation on the data input by the user, to obtain a calculation result.

808. The trusted execution environment of the physical device sends the calculation result to the second operating system of the physical device.

809. The second operating system of the physical device sends the calculation result to the first operating system of the first server.

810. The first operating system of the first server sends the calculation result to the cloud instance of the first server.

It should be noted that for descriptions of step 801 to step 810, refer to related descriptions of the example (1) and the example (2) in the embodiment shown in FIG. 2. Details are not described herein again.

In a possible implementation, the physical device is a second server, a smart card, or an offload card.

In a possible implementation, if the physical device is the second server, the physical channel is a high-speed communication backplane, a high-speed computer extended bus, or a physical network.

In a possible implementation, if the physical device is the smart card or the offload card, the physical channel is a high-speed computer extended bus.

In a possible implementation, the cloud instance is a virtual machine, a container, or a bare metal server, and the trusted execution environment is a virtual machine, a container, or a bare metal server.

It should be noted that content such as information exchange between modules/units in the foregoing method and an execution process is based on a same conception as the system embodiments of this disclosure, and achieves a technical effect the same as that of the system embodiments of this disclosure. For specific content, refer to the descriptions in the foregoing system embodiments of this disclosure. Details are not described herein again.

Figure 9:
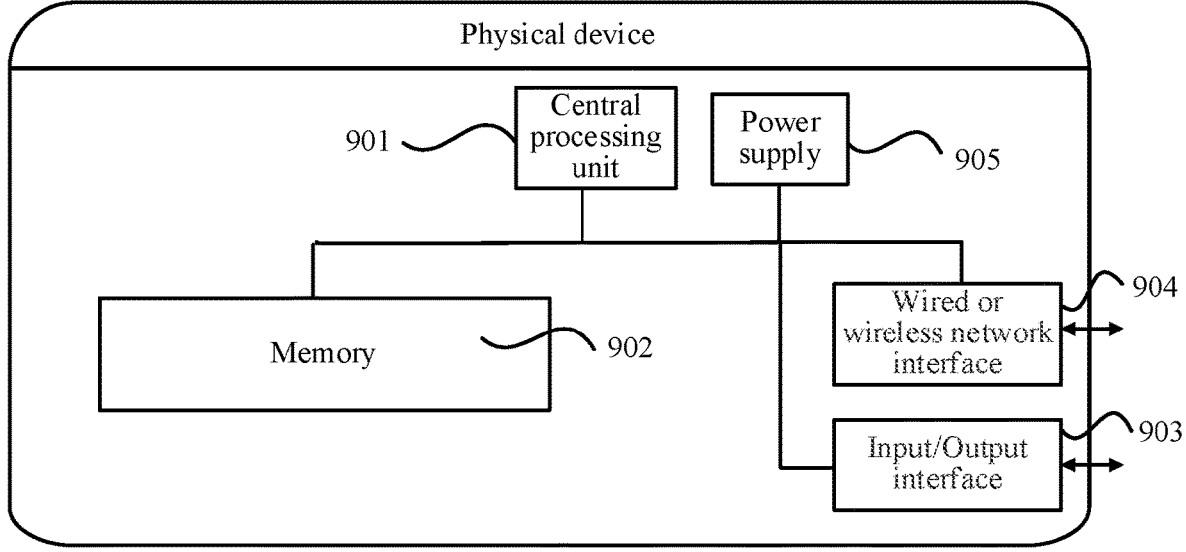
FIG. 9 is a schematic diagram of a structure of a physical device according to an embodiment of this disclosure.

FIG. 9 is a schematic diagram of a structure of a physical device according to an embodiment of this disclosure. As shown in FIG. 9, the physical device is disposed in a cloud service system (for the system, refer to the cloud service system shown in FIG. 2 to FIG. 7). The system further includes a first server, the first server and the physical device are connected through a physical channel, the first server includes a cloud instance, and the physical device includes a trusted execution environment corresponding to the cloud instance. In this embodiment of this disclosure, one physical device may include one or more central processing units 901, a memory 902, an input/output interface 903, a wired or wireless network interface 904, and a power supply 905.

The memory 902 may be used for temporary storage or permanent storage. Further, the central processing unit 901 may be configured to communicate with the memory 902, and perform, on the physical device, a series of instruction operations in the memory 902.

In this embodiment, the central processing unit 901 may perform operations performed by the physical device in the embodiment shown in FIG. 8. Details are not described herein again.

In this embodiment, a specific division manner of functional modules in the central processing unit 901 may be similar to the division manner of the modules such as the trusted execution environment and the second operating system described in FIG. 2 to FIG. 7. Details are not described herein again.

An embodiment of this disclosure further relates to a computer storage medium, including computer-readable instructions. When the computer-readable instructions are executed, the method shown in FIG. 8 is implemented.

An embodiment of this disclosure further relates to a computer program product including instructions. When the computer program product runs on a computer, the computer is enabled to perform the method shown in FIG. 8.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into the units is merely logical function division and there may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented.

The units described as separate parts may or may not be physically separate. Parts displayed as units may or may not be physical units, may be located at one position, or may be distributed on a plurality of network units. Some or all of the units may be selected based on actual requirements to achieve the objectives of the solutions of embodiments.

In addition, each functional unit in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this disclosure. The foregoing storage medium includes any medium that can store program code, such as a Universal Serial Bus (USB) flash drive, a removable hard disk, a read-only memory (ROM), a random-access memory (RAM), a magnetic disk, or an optical disc.

What is claimed is:

1. A system comprising:
a first server comprising:

a cloud instance, wherein the cloud instance comprises data; and
a first operating system; and
a physical device coupled to the first server through a physical channel disposed between the physical device and the server, wherein the physical channel is a high-speed communication backplane, a high-speed computer extended bus, or a physical network when the physical device is a second server, and wherein the physical device comprises a trusted execution environment corresponding to the cloud instance, wherein the trusted execution environment maintains sensitive data of a user corresponding to the cloud instance and is isolated by the physical channel from the first operating system, and wherein the physical device is configured to:
obtain, from the cloud instance, the data;
perform a confidential scheming on the data through the trusted execution environment to obtain a result;
send, to the cloud instance, the result; and
reject operations other than operations related to a confidential request, wherein the trusted execution environment rejects a sensitive data obtaining request when the first operating system is compromised.

2. The system of claim 1, wherein the physical device further comprises a second operating system, and wherein the physical device is further configured to:
receive, from the first operating system through the second operating system, the data; and
send, to the first operating system through the second operating system, the result to enable the first operating system to send the result to the cloud instance.

3. The system of claim 2, wherein the physical device is further configured to:
obtain a key corresponding to the cloud instance through the second operating system; and
further perform, based on the key, the confidential scheming on the data through the trusted execution environment to obtain the result.

4. The system of claim 1, wherein the physical device is the second server, a smart card, or an offload card.

5. The system of claim 4, wherein the physical channel is a high-speed computer extended bus when the physical device is the smart card or the offload card.

6. The system of claim 4, wherein the physical device is an offload card, and wherein the offload card comprises a field-programmable gate array (FPGA) or an application-specific integrated circuit (ASIC).

7. The system of claim 1, wherein the cloud instance is a first virtual machine, a first container, or a first bare metal server, and wherein the trusted execution environment is a second virtual machine, a second container, or a second bare metal server.

8. A method implemented by a physical device, wherein the method comprises:
obtaining, from a cloud instance of a first server, data, wherein the physical device is coupled to the first server through a physical channel disposed between the physical device and the server, wherein the physical channel is a high-speed communication backplane, a high-speed computer extended bus, or a physical network when the physical device is a second server, and wherein the physical device comprises a trusted execution environment corresponding to the cloud instance, wherein the trusted execution environment maintains sensitive data of a user corresponding to the cloud instance and is isolated by the physical channel from the first operating system;

performing, through the trusted execution environment, a confidential scheming on the data to obtain a result;

sending, to the cloud instance, the result; and rejecting operations other than operations related to a confidential request, wherein the trusted execution environment rejects a sensitive data obtaining request when a first operating system of the first server is compromised.

9. The method of claim 8, further comprising:

receiving, through a second operating system of the physical device and from the first operating system of the first server, the data; and sending, to the first operating system, and through the second operating system, the result to enable the first operating system to send the result to the cloud instance.

10. The method of claim 9, further comprising:

obtaining, through the second operating system, a key corresponding to the cloud instance; and further performing, based on the key, the confidential scheming on the data through the trusted execution environment to obtain the result.

11. The method of claim 8, wherein the physical device is the second server, a smart card, or an offload card.

12. The method of claim 11, wherein the physical channel is a high-speed computer extended bus when the physical device is the smart card or the offload card.

13. The method of claim 11, wherein the physical device is an offload card, and wherein the offload card comprises a field-programmable gate array (FPGA) or an application-specific integrated circuit (ASIC).

14. The method of claim 8, wherein the cloud instance is a first virtual machine, a first container, or a first bare metal server, and wherein the trusted execution environment is a second virtual machine, a second container, or a second bare metal server.

15. A physical device comprising:

a memory configured to store instructions and a trusted execution environment; and one or more processors coupled to the memory and configured to execute the instructions to cause the physical device to:

obtain, from a cloud instance of a first server, data, wherein the physical device is coupled to the first server through a physical channel disposed between the physical device and the server, wherein the physical channel is a high-speed communication backplane, a high-speed computer extended bus, or a physical network when the physical device is a second server;

perform a confidential scheming on the data through the trusted execution environment to obtain a result;

send, to the cloud instance, the result; and reject operations other than operations related to a confidential request, wherein the trusted execution environment rejects a sensitive data obtaining request when a first operating system of the first server is compromised, wherein the trusted execution environment maintains sensitive data of a user corresponding to the cloud instance and is isolated by the physical channel from the first operating system.

16. The physical device of claim 15, wherein the memory further comprises a second operating system, and wherein the one or more processors are further configured to execute the instructions to cause the physical device to:

receive, from the first operating system through the second operating system, the data; and send, to the first operating system through the second operating system, the result to enable the first operating system to send the result to the cloud instance.

17. The physical device of claim 16, wherein the one or more processors are further configured to execute the instructions to cause the physical device to:

obtain a key corresponding to the cloud instance through the second operating system; and further perform, based on the key, the confidential scheming on the data through the trusted execution environment to obtain the result.

18. The physical device of claim 15, wherein the physical device is the second server, a smart card, or an offload card.

19. The physical device of claim 18, wherein the physical channel is a high-speed computer extended bus when the physical device is the smart card or the offload card.

20. The physical device of claim 18, wherein the physical device is an offload card, and wherein the offload card comprises a field-programmable gate array (FPGA) or an application-specific integrated circuit (ASIC).

* * * * *